Oct. 17, 1967 W. F. DAHLBERG 3,347,373
OSCILLATING SCREENS
Filed Oct. 7, 1964 4 Sheets-Sheet 1
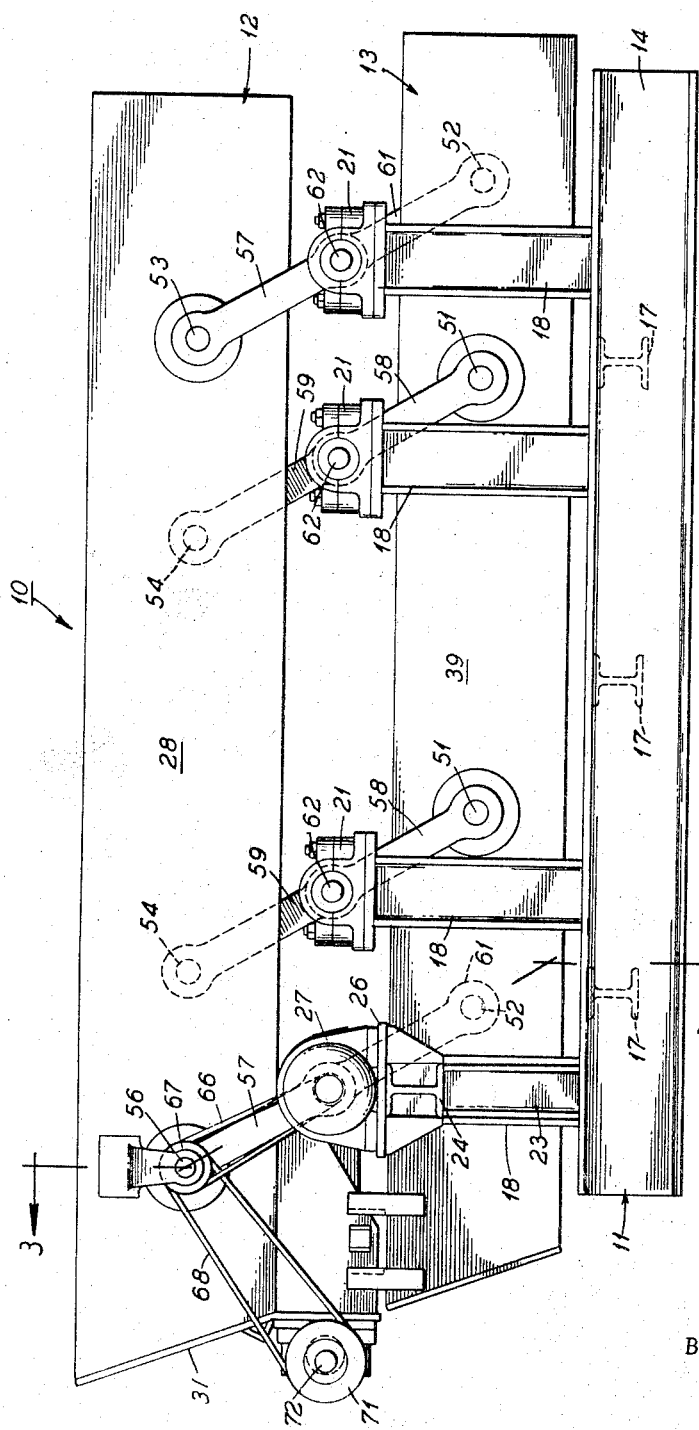
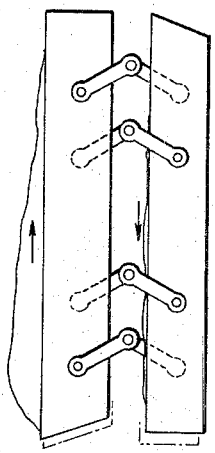
Fig. 6
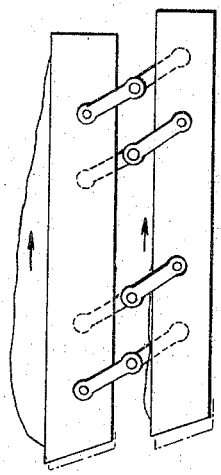
Fig. 7
INVENTOR.
William F. Dahlberg
BY Herman E. Smith
ATTORNEY Oct. 17, 1967 W. F. DAHLBERG 3,347,373
OSCILLATING SCREENS
Filed Oct. 7, 1964 4 Sheets-Sheet 2

INVENTOR.
William F. Dahlberg
BY
Herman E. Smith
ATTORNEY

Oct. 17, 1967  W. F. DAHLBERG  3,347,373
OSCILLATING SCREENS

Filed Oct. 7, 1964  4 Sheets-Sheet 3

INVENTOR.
William F. Dahlberg
BY Herman E. Smith
ATTORNEY

INVENTOR.
William F Dahlberg
BY Herman E. Smith
ATTORNEY

United States Patent Office 3,347,373
Patented Oct. 17, 1967

3,347,373
OSCILLATING SCREENS
William F. Dahlberg, Chicago, Ill., assignor to Goodman Manufacturing Company, Chicago, Ill., a corporation of Illinois
Filed Oct. 7, 1964, Ser. No. 402,086
8 Claims. (Cl. 209—315)

The present invention relates generally to oscillating screens and more particularly to means for applying oscillating motion to such screens.

Many oscillating screens are operated in pairs under so-called "natural frequency" conditions in which the energy of one screen is absorbed in a spring and restored to the other screen. In such apparatus it is customary to interconnect the pair of screens by leaf or coil springs connected to the sides of the screen deck.

Such screens tend to operate at the same frequency but with different amplitudes depending upon the load of material on the screen decks. In order to accommodate the amplitudes, the ends of the spring must flex in accordance with the screen deck to which it is connected. This results in a point of no flexure or null point somewhere between the ends of the springs. If the mass of each screen deck and its load remained constant, the null point could be determined and would provide a very desirable point for connecting the movable screen system to a stationary base.

Since the loads on the screen decks are undergoing continuous change, the null point of the spring is undergoing a similar change of position along the length of the spring. This makes it very difficult to connect the oscillating screen decks to a stationary base while retaining the desirable features of resonant oscillation.

Accordingly, it is a principal object of the present invention to provide a transverse spring for interconnecting a pair of oscillating screen decks.

Another object is to provide a transverse torsion spring in axial alignment with a pair of stationary supports in which the migrating null point of the spring travels in a zone between the supports.

A further object is to provide angular drive apparatus from a stationary base to a system of oscillating screens.

Other objects and advantages will become apparent from the following description together with the drawings.

In the drawings:

FIGURE 1 is a side elevation view of an oscillating screen apparatus according to the present invention;

FIG. 6 is a diagrammatic side view of one embodiment of the invention; and

FIG. 7 is a diagrammatic side view of an alternate form of the invention similar to FIG. 6.

Figure 3:
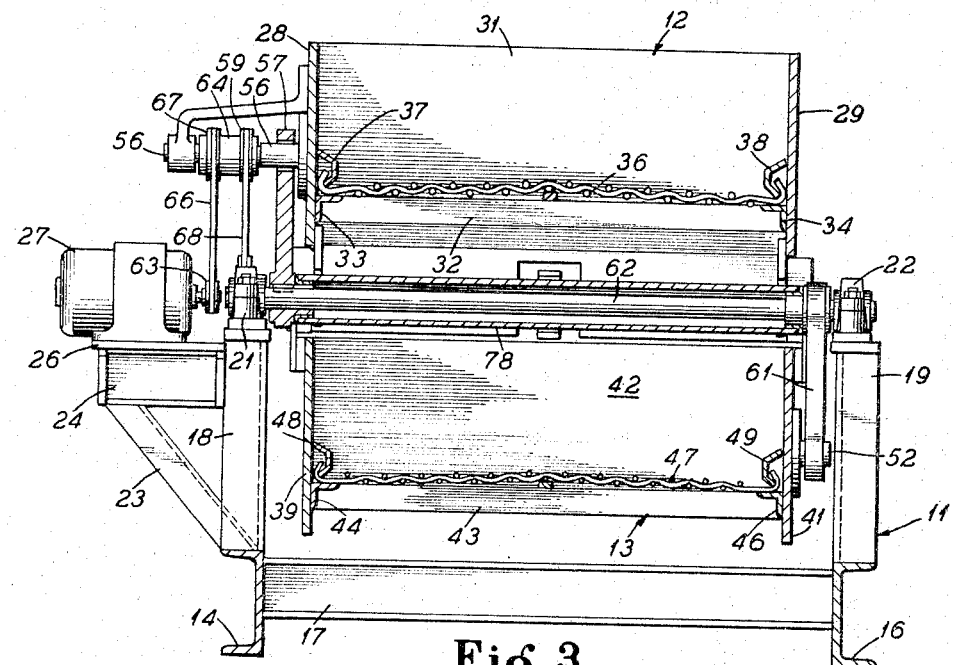
FIG. 3 is an end section view taken along the line 3—3 of FIG. 1 looking in the direction of the arrows.

Referring now more particularly to the drawings, the numeral 10 refers generally to an oscillating screen apparatus having a base 11 and a pair of screen decks 12 and 13. As shown in FIGS. 1 and 3, base 11 is constructed of a pair of longitudinally extending channel members 14 and 16 cross connected by H members 17 with upwardly extending channel members 18 and 19 providing supports for bearings 21 and 22. A knee brace, formed of channel member 23 and H member 24, connected to a channel member 18, supports motor base 26 for motor 27.

Screen deck 12 has a pair of parallel side walls 28 and 29 and an end wall 31. Sidewalls 28 and 29 are connected to each other by end wall 31 and angle members 32. A pair of angle members 33 and 34 extending along the inner sides of walls 28 and 29 provide support for screen cloth 36. Screen tensioners 37 and 38 grip the lateral margins of screen cloth 36 to keep it tightly stretched across the width of screen deck 12.

Screen deck 13 is constructed like deck 12, having side walls 39, 41, end wall 42, angle braces 43, angle supports 44, 46 screen cloth 47 and tensioners 48, 49.

Each of screen decks 12 and 13 has a series of stub shafts 51, 52, 53, 54, 56 projecting outwardly from the side walls. Stub shaft 56 is longer than the others in order to accommodate portions of the drive mechanism to be described later.

Support arms 57, 58, 59, 61 each have one end pivotally journaled on stub shafts 51, 52, 53, 54, 56. Opposed pairs of support arms such as 57, 61 and 58, 59 are keyed to opposite ends of transversely extending torsion bars 62 which are supported for free turning movement in bearings 21 and 22. Thus, screen decks 12 and 13 have their opposite side walls connected to each other through a pair of cranks and a torsion bar. For example, side wall 28 of deck 12 is pivotally connected to support arm 57 which is keyed to one end of torsion bar 62. The other end of torsion bar 62 is keyed to support arm 61 which is pivotally connected to side wall 41 of deck 13. In like manner, side wall 29 of deck 12 is connected to side wall 39 of deck 13 through support arm 59, a transverse torsion bar 62 and support arm 58. Four such resilient crank axle devices support both sides and both ends of a pair of vertically spaced screen decks while at the same time providing a resilient interconnection between the two screen decks.

An opposed pair of support arms may extend from the torsion bar in opposite quadrants as illustrated in FIGS. 1 and 6 or they may extend in vertically adjacent quadrants as shown in FIG. 7. Where the arms extend in opposite quadrants, as shown in FIG. 6, the material in both screen decks tends to travel in the same direction. Where the arms extend into vertically adjacent quadrants, as shown in FIG. 7, the material tends to travel in opposite directions as indicated by the arrows. The counterflow arrangement of FIG. 7 is expected to be advantageous in some applications where it is desirable to take off different sizes at some distance from each other.

The vertical inclination of support arms 57, 58, 59, 61 impose both a horizontal and vertical component of motion on the screen decks and material with the result that the material hops along the substantially horizontal screen deck. This, together with the transverse torsion bar, permits the use of a pair of resiliently connected screen decks in low height installations.

Figure 2:
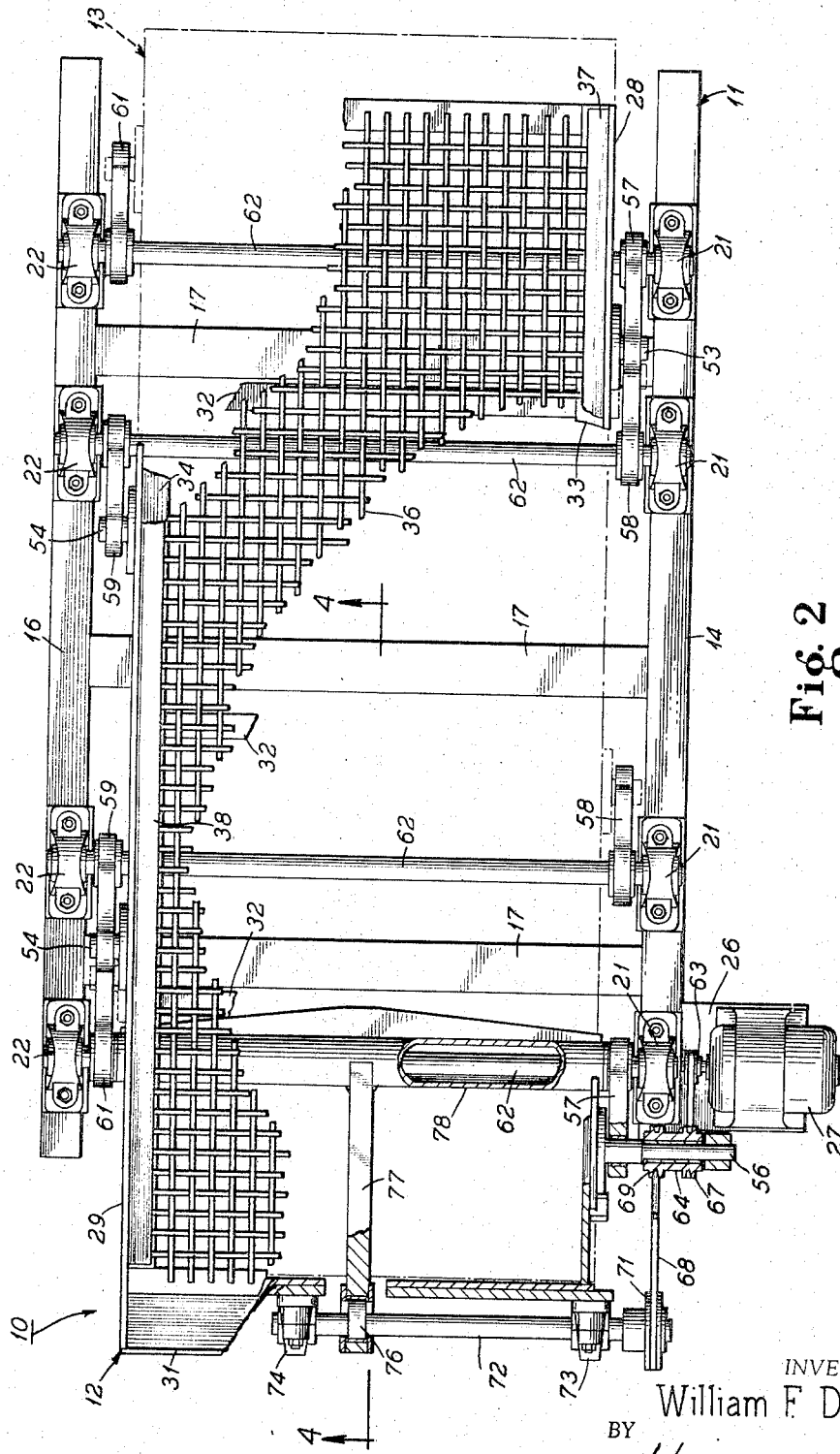
FIG. 2 is a plan view of the apparatus shown in FIG. 1.
Figure 4:
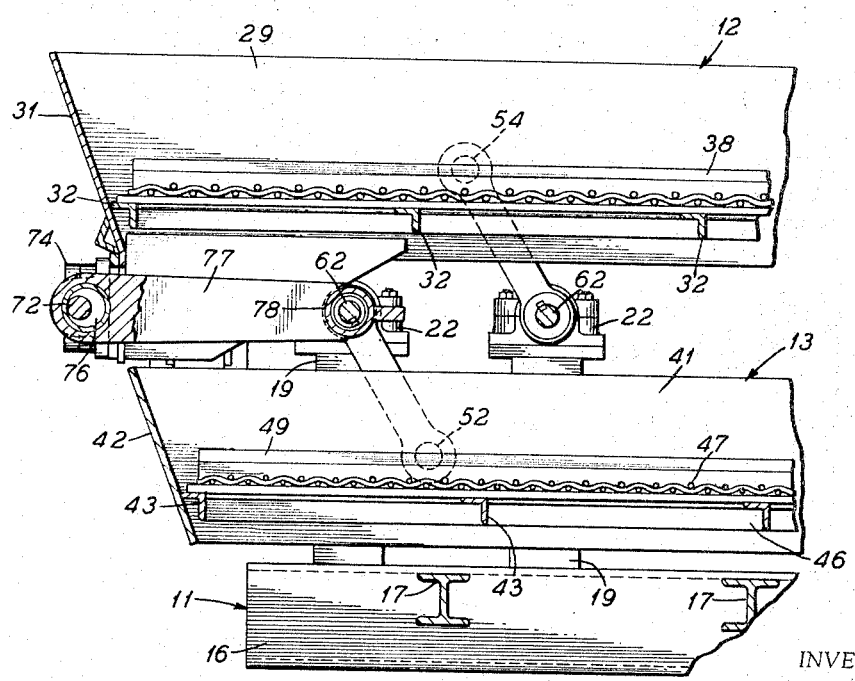
FIG. 4 is a side section view similar to FIG. 1 taken along the line 4—4 of FIG. 2 looking in the direction of the arrows.

Referring now more particularly to FIGS. 1, 2, and 4, the driving apparatus will be described in detail. A motor 27 is mounted on motor base 26 connected to base 11. A drive pulley 63 is connected to the shaft of motor 27 in coaxial alignment with one of the torsion bars 62. A transfer pulley 64 is mounted for free rotation on extended stub shaft 56. A drive belt 66 connects drive pulley 63 with sheave 67 of pulley 64. A second drive belt 68 is connected between sheave 69 of pulley 64 and pulley 71 which is connected to shaft 72.

Shaft 72 is journaled on screen deck 12 in bearings 73 and 74. An eccentric 76 is connected to shaft 72. A connecting link 77 has one end journaled on eccentric 76 and another end connected to a transverse tubular member 78 pivotally mounted with respect to the base 11, coaxially with one of the torsion bars 62. As shown more clearly in FIG. 3, transverse tubular member 78 is journaled on hub-like projections of arms 57 and 61 which in turn are supported on torsion bar 62 which is rotatably mounted in bearings 21 and 22.

It should be noted that connecting rod 77 can be pivotally connected directly to base 11 or in other ways, the illustrated construction being one example of a pivotal mounting.

As shaft 72 is rotated by pulley 71 while being mounted on screen deck 12, the eccentric 76 rotates in connecting link 77 with the result that screen deck 12 is caused to undergo a back and forth oscillation along a path defined by arms 57 and 59. Thus, a positive angular drive mechanism is provided between an oscillating screen deck and a stationary drive motor.

As explained earlier, it is desirable to have both screen decks oscillate at the same frequency although at different amplitudes depending upon the loads. The drive mechanism described above is capable of driving one of the screen decks at a predetermined frequency and amplitude. As a result, the amplitude of the other screen deck 13 must vary in order to maintain the predetermined frequency of oscillation.

Figure 5:
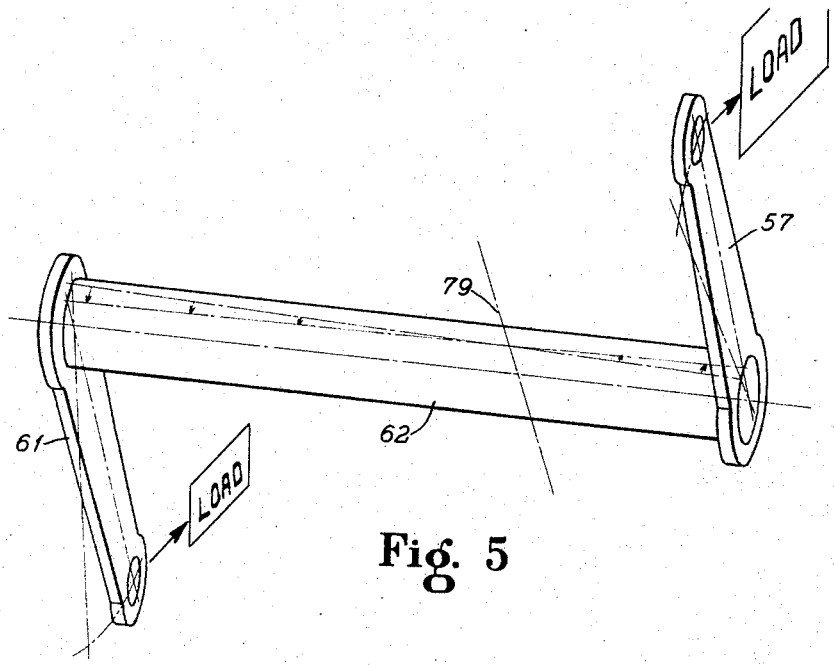
FIG. 5 is a diagrammatic view of a torsion bar as used in the present invention.

Accordingly, screen deck 13 is connected to and driven by screen deck 12 through torsion bars 62. The resilient crank axle connection between decks 12 and 13 is illustrated diagrammatically in FIG. 5. The load connected to arm 57 represents deck 12 and its material and the load connected to arm 61 represents deck 13 with less material than deck 12. In this case, arm 57 will oscillate according to the frequency and amplitude impressed on deck 12 by the driving apparatus. The frequency of arm 61 will be the same, but its amplitude will be greater as a result of less mass in the load. This is illustrated by the location of the null point 79 in FIG. 5.

As the mass of deck 13 and its material changes, the amplitude of arm 61 will change with the result that null point 79 will migrate along the axis of torsion bar 62. Whatever the position of null point 79 in the transverse direction, it is always coaxially aligned with bearings 21 and 22 which support torsion bar 62 and screen decks 12 and 13. Thus, by providing a torsion spring in the transverse plane, it is possible to provide a stationary support for both screen decks at the virtual null point of the spring even though the null point is undergoing transverse migration.

While I have shown and described a preferred embodiment of my invention, it is to be understood that various forms and modifications can be practiced within the spirit of the invention and the scope of the appended claims.

I claim:

1. In an oscillating screen,
   a base;
   first and second at least partially superposed longitudinally extending pans supported on said base;
   a plurality of pivotally mounted supporting members interconnecting between said base and said pans, at least one of said supporting members extending between said base and said first pan and having its pivotal axis transversely aligned with the pivotal axis of another of said supporting members extending between said base and said second pan;
   drive means connected between said firts pan and said base effective to oscillate said first pan longtiudinally relative to said base; and
   torsionally resilient connecting means extending transversely in alignment with said pivotal axes, having opposite ends connected respectively to said one and another supporting members.

2. In an oscillating screen;
   a base;
   a pair of at least partially superposed longitndinally extending screen decks spaced vertically from said base;
   at least a pair of axially aligned laterally spaced support arms pivotally mounted on said base, each arm connected to a respective screen deck;
   drive means connected between said base and one of said decks effective to oscillate said one deck relative to said base; and
   torsionally resilient connecting means extending transversely between said pair of support arms in alignment with the pivotal axes thereof having opposite ends connected to respective support arms.

3. In an oscillating screen;
   a base;
   at least one pair of laterally spaced aligned bearing members extending from said base;
   a pair of screen decks extending longitudinally between said bearing members and spaced vertically one above and one below said bearing members;
   a support arm journaled in each of said bearing members, one arm being connected to one of said screen decks and the opposite arm being connected to the other of said screen decks;
   elongated torsionally resilient connecting means extending transversely in alignment with said bearing members between said decks having opposite ends connected to respective support arms; and
   oscillatory drive means connected to one of said screen decks.

4. In an oscillating screen,
   a base;
   a screen deck supported on said base;
   eccentric drive means mounted on said screen deck;
   a connecting link having one end journaled on said eccentric drive means and its other end pivotally connected to said base;
   rotary power means mounted on said base, spaced horizontally from said eccentric drive means;
   power transfer means mounted on said screen deck spaced horizontally from said eccentric drive means;
   first power transmission means extending between and drivingly interconnecting said rotary power means and said power transfer means; and
   second power transmission means extending between and drivingly interconnecting said power transfer means and said eccentric drive means, said first and second transmission means extending angularly with respect to each other.

5. In an oscillating screen,
   a base;
   a screen deck supported on said base;
   a support arm having a first pivotal connection to said base and a second pivotal connection to said screen deck;
   a shaft journaled on said screen deck, spaced from said second pivotal connection;
   an eccentric drive connected to said shaft;
   a first drive pulley journaled on said base coaxially with said first pivotal connection;
   a second pulley journaled on said screen deck coaxially with said second pivotal connection;
   a third pulley connected to said shaft;
   driving belts connecting said first and second pulleys and said second and third pulleys; and
   a connecting link journaled on said eccentric and pivotally connected to said base coaxially with said first pivotal connection.

6. In an oscillating screen,
   an elongated base;
   a plurality of bearings mounted on said base in transversely aligned pairs;
   at least one transversely extending torsion bar journaled in a transverse pair of said bearings;
   spaced lever arms extending radially from said torsion bar;
   a pair of screen decks supported on said bearings, each connected to a respective one of said lever arms;
   a drive motor mounted on said base in axial alignment with one of said bearings;
   a support member having one portion pivotally mounted on said base coaxially with said motor, and having another portion pivotally connected to one of said screen decks;

first power transmission means connected to said motor and extending along said support member;

second power transmission means drivingly connected between said first transmission means and an eccentric drive on said one screen deck; and a puller rod member extending between said eccentric drive and said base.

7. In an oscillating screen, a base;

pairs of transversely aligned bearings mounted on said base;

at least one torsionally resilient crank axle supported in a pair of said bearings including a transversely extending torsion bar having a radially extending arm connected near each end thereof, said arms being inclined with the vertical in opposite quadrants;

a pair of screen decks located one above and one below said torsion bar, said decks being at least partially superposed, each deck connected to a respective one of said radial arms; and means for oscillating one of said decks with respect to said base.

8. In an oscillating screen, a base;

pairs of transversely aligned bearings mounted on said base;

at least one torsionally resilient crank axle supported in a pair of said bearings including a transversely extending torsion bar having a radially extending arm connected near each end thereof, said arms being inclined with the vertical in vertically adjacent quadrants;

a pair of screen decks located one above and one below said torsion bar, said decks being at least partially superposed, each deck connected to a respective one of said radial arms; and means for oscillating one of said decks with respect to said base.

References Cited

UNITED STATES PATENTS

| | | | |
|---|---|---|---|
| 2,009,219 | 7/1935 | Blackburn | 209—329 |
| 2,188,060 | 1/1940 | Robins | 209—329 |
| 2,241,527 | 5/1941 | Schieferstein | 74—61 |
| 2,638,206 | 5/1953 | Musschoot | 198—220 |

FOREIGN PATENTS

| | | |
|---|---|---|
| 5,214 | 12/1931 | Australia. |
| 545,014 | 2/1965 | Belgium. |
| 759,021 | 10/1956 | Great Britain. |
| 301,315 | 9/1932 | Italy. |

HARRY B. THORNTON, *Primary Examiner.*

FRANK W. LUTTER, *Examiner.*

R. HALPER, *Assistant Examiner.*